Dec. 14, 1943.  R. SKAGERBERG  2,336,646
APPARATUS FOR DIGESTER CONTROL
Filed July 9, 1938
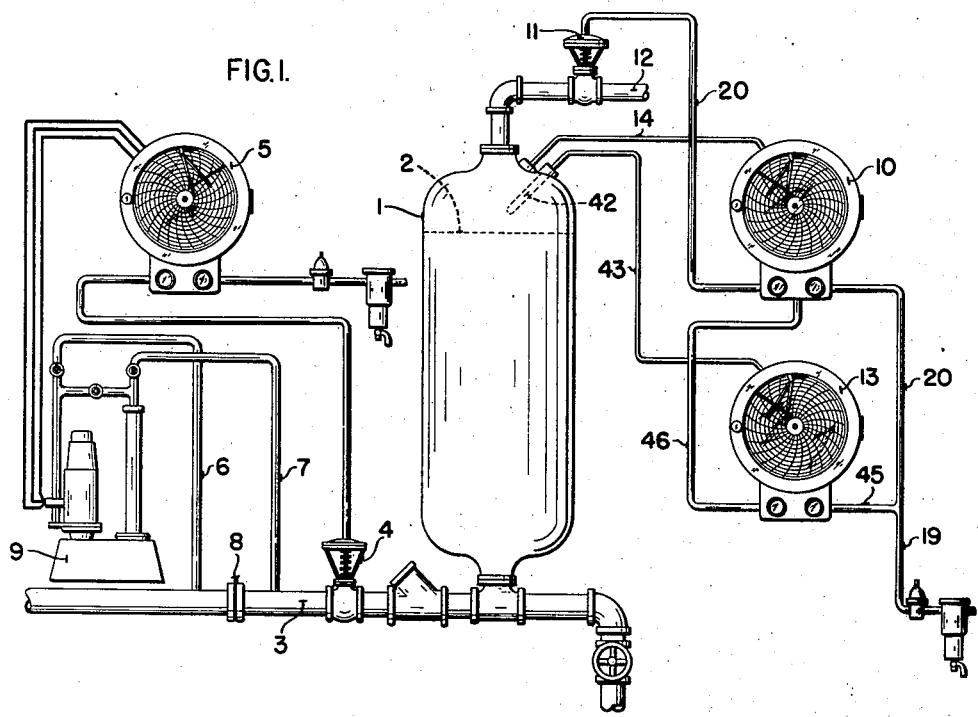
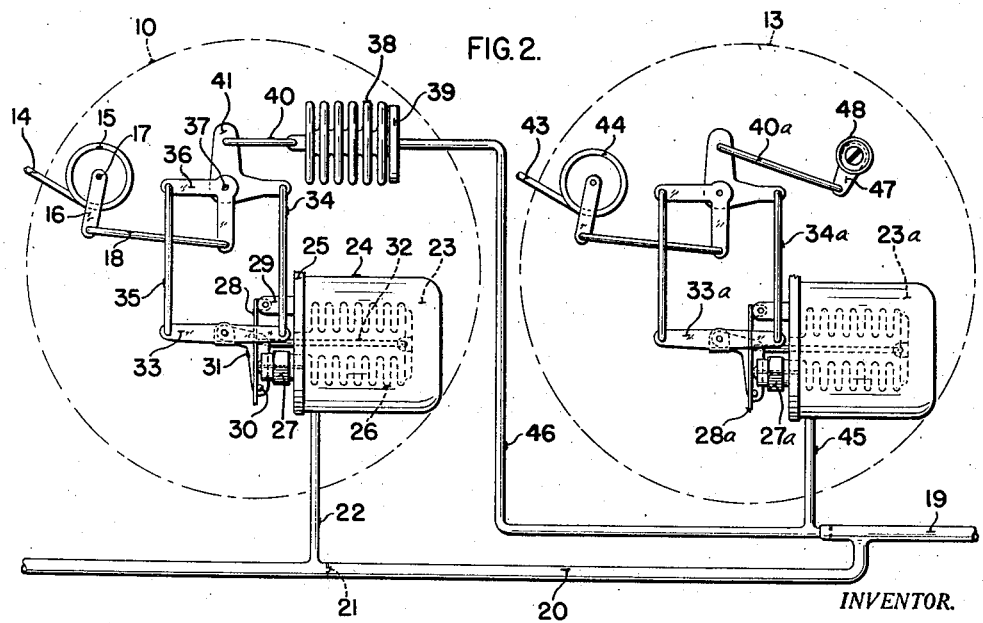
INVENTOR.
RUTCHER SKAGERBERG
BY George W. Munselaus
ATTORNEY Patented Dec. 14, 1943

2,336,646

UNITED STATES PATENT OFFICE 2,336,646

APPARATUS FOR DIGESTER CONTROL

Rutcher Skagerberg, Penn Wynne, Pa., assignor to The Brown Instrument Company, Philadelphia, Pa., a corporation of Pennsylvania Application July 9, 1938, Serial No. 218,296

5 Claims. (Cl. 92—7)

The present invention relates to the process of digesting wood chips in a suitable digester to procure pulp, and, more particularly, to a manner of relieving the pressure in the digester that is created by gases liberated during the digesting process.

The usual process of cooking chemical pulp consists of putting chips and suitable chemicals into a digester, tightly closing the same, and introducing steam into the digester to carry out the cooking process. The addition of the heat produces a chemical reaction in the charge which separates the cellulose from the lignin, pitch, etc., and effects the so-called digesting process. This chemical reaction also liberates a large quantity of sulphur dioxide gas which produces a considerable pressure in the digester. In order to permit introduction of more steam and keep the pressure within reasonable limits, it is customary from time to time to relieve this pressure by venting the gases from the top of the digester.

My invention is directed to an improved methor and apparatus for relief of the pressure in a digester by operating a relief valve from a pressure regulator in accordance with the pressure of the gases therein and changing the control point of the pressure regulator in accordance with the temperature of the gases.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a diagrammatic view of a digester and its control instruments; and

Fig. 2 is a detail view of the pressure controlling instruments.

Referring to Fig. 1, there is shown a digester 1 which is filled with chips and chemicals to a predetermined level that is diagrammatically illustrated by the dotted line 2. After the digester has been charged and tightly closed, steam is forced into the bottom through pipe 3 to carry out the cooking process. The flow of steam into the digester is regulated to keep it at a constant value by an air-operated valve 4 in the pipe 3. The adjustment of the valve 4 is determined in accordance with the flow by a flow controller 5.

The particular type of flow controller does not form part of my invention and need not be described in detail. It is enough to say that it may be of any commercial type and is herein illustrated as being a "Brown electric flow meter" with an air-operated control. The control is obtained by having pressure taps 6 and 7, on either side of an orifice plate 8 in the pipe 3, lead to the legs of a U-tube manometer 9. As the flow varies, the float in the manometer will change its position and adjust the flow controller 5 so that air with a pressure proportional to the flow will be impressed upon the diaphragm of valve 4 to change the adjustment of the valve and bring the flow back to normal. The normal value of the flow may be adjusted from time to time as necessary by an adjustment provided on the flow controller 5.

As the cooking of the chips progresses, a pressure is built up in the top of the digester by the increase in volume of the charge by the addition of the steam, and also by the accumulation of the sulphur dioxide gas that is liberated as a result of the cooking. It is usual to permit this gas to accumulate until it has reached a pressure equal to that of saturated steam at the temperature in the digester. It has been common practice to utilize a pressure regulator that was set for some predetermined value, which setting was kept constant for the entire cook. This method does not take into account the variations in temperature that occur in the digester during the cooking process.

Accordingly, I provide a pressure regulator 10 which is responsive to the pressure in the digester to control a relief valve 11 that is located in a vent pipe 12. The control point of the regulator 10, the point at which it opens the valve 11, is adjusted by a temperature controller 13 which is responsive to the temperature of the digester.

To measure the pressure of the gases in the digester, a tube 14 is connected therewith, above the liquid level 2, and extends to a pressure responsive helix 15 in the regulator 10. As the pressure rises, the helix will tend to unwind and rotate on arm 16, connected to its end, in a clockwise direction around a supporting shaft 17 to shift a link 18, pivoted thereto, to the left. Movement of this link, through a mechanism now to be described, varies the pressure of air acting on a diaphragm in valve 11 to vent the gases. It is noted that the valve is of the type in which a spring is used to open the valve, and air pressure acting on a diaphragm is used to close it.

Air is supplied to the valve 11 through lines 19 and 20, the latter of which is provided with a restriction 21. Between the restriction 21 and valve 11 is a branch line 22 leading to the control instrument 10. The end of branch 22 opens into a chamber 23 that is formed between a cap 24 attached to a support 25 and a bellows 26 that is also attached to the support. The chamber 23 is provided with an outlet in the form of a nozzle 27 that has a slightly larger opening than restriction 21 so that when the nozzle is opened, air can flow therethrough faster than it can through restriction 21, and thereby reduce the pressure in line 20 and on the diaphragm of valve 11.

A means for varying the opening of the nozzle 27 in accordance with the pressure in the digester is provided by a flapper valve 28 that is pivoted on an arm 29 attached to support 25. The flapper 28 is normally biased in a counter-clockwise direction toward the nozzle 27 to restrict the flow therethrough and may be moved clockwise away from the nozzle by a pin 30 that projects from one arm of a bell-crank 31 that is pivoted on the outer end of a rod 32 which is attached to the inner wall of bellows 26 and extends through an opening in the support 25. The other or horizontal arm of the bell-crank 31 is pivoted to the center of a floating lever 33 that normally has its fulcrum at the lower end of a link 34. The left end of lever 33 is connected through link 35 to one arm of a bell-crank 36 that is mounted to turn around a shaft 37. The second arm of bell-crank 36 is attached to for movement by the link 18.

In the operation of the device, as the pressure in the digester increases, for example, the link 18 is shifted to the left to move bell-crank 36 clockwise around shaft 37 and move lever 33, through link 35, clockwise around its fulcrum on the lower end of link 34. This in turn shifts bell-crank 31 clockwise around its pivot on rod 32 so that pin 30 will move the flapper valve 28 away from nozzle 27 to permit more air to escape therethrough. The consequent reduction in pressure in chamber 23, line 20, and valve 11 will cause an opening of the valve to permit an escape of the gases in the digester through the vent 12 to return the pressure in the digester to its correct value. As the pressure in chamber 23 is reduced, the bellows 26 will expand and give a follow-up movement to the flapper 28 by means of rod 32. The rod 32 will be shifted to the right and move the pivot of bell-crank 31 so that the pin 30 will permit flapper 28 to move toward nozzle 27 to prevent too great a reduction in pressure in the system and a consequent hunting of the valve.

As the temperature in the digester increases, it will be necessary to raise the control point of the pressure of regulator 10 in order that it may continue to control at a pressure which is equal to that of saturated steam at the temperature in the digester. This is accomplished by shifting the link 34 downwardly to lower the fulcrum of lever 33. In this manner, the link 35 has to be lifted higher by bell-crank 36 and link 18 due to a higher pressure before the flapper 28 will be moved away from nozzle 27 to lower the pressure in line 20 and open valve 11.

While the adjustment of link 34 may be performed manually by reference to a temperature recorder, movement of link 34 is preferably accomplished automatically by contracting the bellows 38 in response to an increase in temperature in the digester. The bellows 38 is attached to a plate 39 at its right end, which plate is fastened to the frame of instrument 10. The left end of bellows 38 is connected by a link 40 to one arm of bell-crank 41, pivoted at 37, whose other arm is attached to the upper end of link 34.

A temperature responsive bulb 42 located within the upper part of the digester is connected by a capillary tube 43 with a helix 44 located within the temperature controller 13. Expansion and contraction of the helix 44 in response to temperature changes in the digester moves, through a linkage similar to that in regulator 10, a flapper valve 28a with respect to a nozzle 27a. The relative movement of the flapper and nozzle, in a manner described above in connection with regulator 10, will vary the amount of air escaping through nozzle 27a and thereby the pressure in chamber 23a, branch line 45, line 46 and bellows 38.

The operation of the temperature controller 13 is similar to that of the pressure regulator 10. As the temperature increases, helix 44 unwinds and, through the linkage shown, moves flapper 28a away from nozzle 27a. This causes a reduction in pressure in the fluid system including bellows 38 with a consequent contraction of the bellows. As this bellows contracts, the control point of regulator 10 is shifted so that it will control at a higher pressure.

A means is provided for shifting the control point of the temperature controller 13 so that it will control correctly for the different temperatures that will be necessary during the cooking of different types of chips. This means comprises a crank 47 which may be turned by a knob 48 to various positions and is held in its adjusted position by some suitable means, such as a friction washer (not shown). Turning the knob 48 will, through a link 40a, shift link 34a up and down to vary the fulcrum of floating lever 33a.

It will be obvious to those skilled in the art that other types of controllers may be used in place of those described above if it is so desired.

From the above description, it will be seen that I have provided a control system in which the temperature and pressure are taken at the same point in a digester, where the gas tends to collect, and the relief valve is opened to discharge the non-condensible gases as it is required to keep temperature and pressure corresponding to a saturated steam condition.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a system of digester control, the combination with a digester, of a relief valve for the digester, pressure responsive control means to control the opening of the valve in response to the pressure in the digester for maintaining desired pressure conditions therein, and temperature responsive means to reset the pressure control means in response to the temperature in the digester.

2. In a system of digester control, the combination with a digester, of means to supply steam to the digester, a vent pipe to relieve the pressure in the digester, a valve in said pipe to control the pressure in the digester, and temperature and pressure responsive control means to control the operation of said valve jointly in response to the temperature and pressure in said digester.

3. In a system of fibrous pulp digester control, the combination of a digester, a steam line leading to the bottom thereof, means for controlling the entrance of steam therethrough, a vent line leading from the top of said digester, a relief valve in said line, means to control conditions within said digester by varying the opening of said valve, said means comprising a pressure controller to adjust said valve in accordance with pressure conditions within the digester, and a temperature controller coacting with the pressure controller to adjust said pressure controller in accordance with temperature conditions in said digester.

4. In a digester, the combination of a vent pipe, a valve in said pipe to control the pressure in the digester, a pressure responsive element actuated in accordance with the pressure within a gaseous space in said digester, means actuated by the pressure responsive element to operate said valve in accordance with actuation of said pressure responsive element, a temperature responsive element located within a gaseous space within said digester, and means actuated by the temperature responsive element to adjust said valve operating means in accordance with the response of said temperature responsive element.

5. In a system of digester control, the combination with a digester having a relief pipe extending therefrom and a valve in said pipe, of a pressure controller having an adjustable control point and responsive to the pressure in said digester, means operated by said controller to adjust the opening of said valve in response to pressure changes in said digester, a temperature controller responsive to the temperature in said digester, and means operated by said temperature controller to adjust the control point of said pressure controller, whereby said valve will be operated in accordance with the pressure and temperature within the digester.

RUTCHER SKAGERBERG.